United States Patent
Chen et al.

(10) Patent No.: US 12,439,915 B2
(45) Date of Patent: *Oct. 14, 2025

(54) STABLE HERBICIDAL COMPOSITIONS COMPRISING AMINE OXIDE AND TERTIARY AMINE

(71) Applicant: SPECIALTY OPERATIONS FRANCE, Lyons (FR)

(72) Inventors: Zixian Chen, Singapore (SG); Renato Monterosso, Melbourne (AU); Yuming Zhou, Jiangsu (CN); Paige Lana O'Brien, North Parramatta (AU)

(73) Assignee: SPECIALTY OPERATIONS FRANCE, Lyons (FR)

(*) Notice: Subject to any disclaimer, the term of this patent is extended or adjusted under 35 U.S.C. 154(b) by 764 days.

This patent is subject to a terminal disclaimer.

(21) Appl. No.: 17/760,774

(22) PCT Filed: Aug. 20, 2020

(86) PCT No.: PCT/CN2020/110174
§ 371 (c)(1),
(2) Date: Mar. 16, 2022

(87) PCT Pub. No.: WO2021/052094
PCT Pub. Date: Mar. 25, 2021

(65) Prior Publication Data
US 2022/0338474 A1    Oct. 27, 2022

(30) Foreign Application Priority Data
Sep. 20, 2019   (WO) ................ PCT/CN2019/106891

(51) Int. Cl.
*A01N 33/02*   (2006.01)
*A01N 29/02*   (2006.01)
*A01N 57/16*   (2006.01)
*A01P 13/00*   (2006.01)

(52) U.S. Cl.
CPC .............. *A01N 33/02* (2013.01); *A01N 29/02* (2013.01); *A01N 57/16* (2013.01); *A01P 13/00* (2021.08)

(58) Field of Classification Search
CPC ........ A01N 33/02; A01N 29/02; A01N 57/16; A01P 13/00
See application file for complete search history.

(56) References Cited

U.S. PATENT DOCUMENTS

| | | | | |
|---|---|---|---|---|
| 2003/0104943 | A1* | 6/2003 | Lennon ................ | A01N 25/30 504/206 |
| 2012/0040832 | A1* | 2/2012 | Chuah .................. | A01N 57/20 504/362 |
| 2013/0202291 | A1* | 8/2013 | Cavaliere ............ | H04L 43/0864 398/33 |
| 2014/0194289 | A1* | 7/2014 | Sclapari ............... | A01N 33/12 504/303 |
| 2016/0205926 | A1* | 7/2016 | Downer ................ | A01N 25/06 |

FOREIGN PATENT DOCUMENTS

WO   WO 2006/069794   *   7/2006   ............. A01N 25/30

* cited by examiner

*Primary Examiner* — Shirley V Gembeh
(74) *Attorney, Agent, or Firm* — Osha Bergman Watanabe & Burton LLP

(57) ABSTRACT

Herbicidal compositions comprising high load aminophosphate or aminophosphonate salts, in particular high load glyphosate salts, wherein the compositions comprises a surfactant mixture of at least an $C_6$-$C_{22}$ amine oxide and a tertiary amine surfactants. The compositions have good low temperature stability (i.e., no crystal formulation or phase separation) among other beneficial properties.

20 Claims, No Drawings

STABLE HERBICIDAL COMPOSITIONS COMPRISING AMINE OXIDE AND TERTIARY AMINE

This application is a U.S. national stage entry under 35 U.S.C. § 371 of international patent application No. PCT/CN2020/110174 filed on Aug. 20, 2020, which claims priority to international patent application No. PCT/CN2019/106891 filed on Sep. 20, 2019, the whole content of this application being entirely incorporated herein by reference.

FIELD OF THE INVENTION

The invention relates to stable agricultural herbicide compositions, comprising amine oxide and tertiary amine.

BACKGROUND

Herbicidally active glyphosate compositions are known and are commercially available in the form of ammonium, isopropylamine and other salts. These herbicidal compositions are generally applied to weeds and unwanted vegetation in the form of an aqueous formulation containing a variety of adjuvants including for example wetting agents, surfactants, dispersants, anti-foam agents, humectants, and the like. The activity of the glyphosate composition may be improved considerably by the careful choice of additives.

Typically, there is a desire to have a higher glyphosate concentration, as the end-user (e.g., farmer) can modify the use concentration (amount of active applied to the field) by adjusting the dilution rate, and can avoid handling much product (the higher the concentration is, the lower the weight is for example).

Concentrated compositions can comprise a high amount of glyphosate, water, and at least one surfactant that can be useful as a formulation aid (dispersion, dissolution and/or stability of the glyphosate in water), and/or as a biological activator (for example increasing the efficacy of the glyphosate, for example by encouraging wetting of a weed to be eliminated, or by encouraging penetration of the glyphosate into the weed). The relative amounts of glyphosate, surfactant(s) and optionally further ingredients may have also an effect onto the rheological properties of the formulation (for example viscosity, or ability to be spread). The rheological properties of the formulation as such or upon dilution are important for handling and spreading purpose.

Where the concentration of glyphosate is high, crystallization is often a significant problem. Crystallization can occur at different temperatures, at different glyphosate concentrations, or when diluting with water, but in particular is problematic at low temperatures. Crystallization is characterized by formation of small solid particles comprising glyphosate. These small particles can have the bad impact of filters clogging, nozzles clogging, creating unnecessary hazardous waste problems to dispose off the crystals, loss of activity (bioefficacy), and/or bad repartition of the active on the field. High viscosities of the formulations is also a problem as this can cause phase separation and/or difficulties for users in processing the formulations.

There is a need for new compositions that address at least one of the following: low temperature stability, lower cost, by using lower cost ingredients (the aminophosphate or aminophosphonate salts and/or the surfactants), better ecotoxic profile (especially lowering amounts of fatty ethoxyltes such as fatty amine ethoxyles), better viscosity profile, especially at lower temperature, and/or by avoiding crystallization, while keeping an acceptable efficacy or equivalent efficacy or even improving efficacy.

There is a continuing interest in agricultural pesticide compositions, more particularly agricultural fungicide compositions, which exhibit improved properties.

SUMMARY OF THE INVENTION

In one aspect, described herein is a composition, notably an aqueous herbicidal composition, comprising:
(i) at least two aminophosphate or aminophosphinate salts in a total amount of equal or greater than 540 g/L (ae); in particular at least two glyphosate salts in a total amount of equal or greater than 540 g/L (ae);
(ii) an amine oxide surfactant of the formula:

$$R_1-N^+R_2R_3-O^-  \quad (I)$$

wherein $R_1$ is a $C_6$-$C_{22}$, linear or branched, alkyl or hydroxyalkyl; $R_2$ and $R_3$ is independently a $C_1$-$C_4$ alkyl or hydroxyalkyl; and
a tertiary amine surfactant of the formula:

$$R_4R_5R_6N \quad (II)$$

wherein $R_4$ and $R_5$ is independently a $C_1$-$C_4$ alkyl, alkenyl, hydroxyalkyl or hydroxyalkenyl, or form a ring structure; $R_6$ is a $C_6$-$C_{22}$ alkyl, alkenyl, hydroxyalkyl or hydroxyalkenyl; or the salts thereof.

In some embodiments, the at least two aminophosphate or aminophosphinate salts, such as the at least two glyphosate salts, are present in a total amount of equal or greater than 540 g/L (ae), for instance equal or greater than 560 g/L (ae), for instance equal or greater than 600 g/L (ae).

In some embodiments, the amine oxide surfactant is an alkyl dimethyl amine oxide according to general formula:

$$R_7-N^+(CH_3)_2-O^- \quad (III)$$

wherein $R_7$ is a $C_6$-$C_{22}$, linear or branched, alkyl or hydroxyalkyl.

In some embodiments, $R_4$ and $R_5$ as defined in the general formula (II) (for tertiary amine) is independently a $C_1$-$C_4$ alkyl, in particular methyl, and $R_6$ is a $C_6$-$C_{22}$ alkyl.

In some embodiments, the composition further comprises a salt, in particular, a quaternary ammonium salt such as choline chloride.

In some embodiments, the composition is stable at a temperature of equal or less than 20° C., typically equal or less than 10° C., or equal or less than 5° C.

In another aspect, described herein are methods for regulating plant growth comprising contacting any aqueous herbicidal composition, as described herein, with a plant.

In another aspect, described is the use of any of the herbicidal compositions herein for spray applying to a plant.

DETAILED DESCRIPTION OF INVENTION

Throughout the description, including the claims, the term "comprising one" or "comprising a" should be understood as being synonymous with the term "comprising at least one", unless otherwise specified. The terms "between" and "from . . . to . . . " should be understood as being inclusive of the limits.

The articles "a", "an" and "the" are used to refer to one or to more than one (i.e., to at least one) of the grammatical object of the article.

It should be noted that in specifying any range of concentration, weight ratio or amount, any particular upper concentration, weight ratio or amount can be associated with any particular lower concentration, weight ratio or amount, respectively.

As used herein, the term "alkyl" means a saturated hydrocarbon radical, which may be linear, branched or cyclic, such as, methyl, ethyl, n-propyl, iso-propyl, n-butyl, sec-butyl, t-butyl, pentyl, n-hexyl, cyclohexyl.

As used herein, the term "alkenyl" as a group or part of a group denotes an aliphatic hydrocarbon group containing at least one carbon-carbon double bond and which may be linear or branched. The group may contain a plurality of double bonds in the normal chain and the orientation about each is independently E or Z. Exemplary alkenyl groups include, but are not limited to, ethenyl, propenyl, butenyl, pentenyl, hexenyl, heptenyl, octenyl and nonenyl. The group may be a terminal group or a bridging group.

As used herein, the term "hydroxyalkyl" means an alkyl radical, which is substituted with a hydroxyl groups, such as hydroxymethyl, hydroxyethyl, hydroxypropyl, and hydroxydecyl.

As used herein, the terminology "$(C_n-C_m)$" in reference to an organic group, wherein n and m are each integers, indicates that the group may contain from n carbon atoms to m carbon atoms per group.

As used herein, "liquid medium" means a medium that is in the liquid phase at a temperature of 25° C. and a pressure of one atmosphere. The liquid medium may be a non-aqueous liquid medium or an aqueous liquid medium.

As used herein the term "surfactant" means a compound that is capable of lowering the surface tension of water, more typically, a compound selected from one of five classes of compounds, that is, cationic surfactants, anionic surfactants, amphoteric surfactants, zwitterionic surfactants, and non-ionic surfactants, as well as mixtures thereof.

In one embodiment, the liquid medium is an aqueous liquid medium. As used herein, the terminology "aqueous medium" means a single phase liquid medium that contains more than a trace amount of water, typically, based on 100 pbw of the aqueous medium, more than 0.1 pbw water. Suitable aqueous media more typically comprise, based on 100 pbw of the aqueous medium, greater than about 5 pbw water, even more typically greater than 10 pbw water. In one embodiment, the aqueous emulsion comprises, based on 100 pbw of the aqueous medium, greater than 40 pbw water, more typically, greater than 50 pbw water. The aqueous medium may, optionally, further comprise water soluble or water miscible components dissolved in the aqueous medium. The terminology "water miscible" as used herein means miscible in all proportions with water. Suitable water miscible organic liquids include, for example, $(C_1-C_6)$alcohols, such as methanol, ethanol, propanol, and $(C_1-C_6)$ polyols, such as glycerol, ethylene glycol, propylene glycol, and diethylene glycol, The composition of the present invention may, optionally, further comprise one or more water insoluble or water immiscible components, such as a water immiscible organic liquid, wherein the combined aqueous medium and water insoluble or water immiscible components form a micro emulsion, or a multi-phase system such as, for example, an emulsion, a suspension or a suspoemulsion, in which the aqueous medium is in the form of a discontinuous phase dispersed in a continuous phase of the water insoluble or water immiscible component, or, more typically, the water insoluble or water immiscible component is in the form of a discontinuous phase dispersed in a continuous phase of the aqueous medium.

The term "glyphosate composition" is used herein to mean a herbicidal composition comprising as active ingredient N-phosphonomethylglycine or a herbicidally acceptable salt thereof.

The amounts of the at least two aminophosphate or aminophosphonate salts, unless otherwise provided, are expressed as acid equivalents (ae). The amounts of surfactants or compositions of matter are amounts "as is", as opposed to amounts as active matter, dry amounts, or the like, unless otherwise provided.

Glyphosate refers to N-(phosphonomethyl)glycine. Glufosinate refers to 4-[hydroxy(methyl)phosphinoyl]-DL-homoalanine.

Aminophosphate or Aminophosphonate Salts

Aminophosphate or aminophosphonate salts are known by the one skilled in the art.

Preferred salts are glyphosate salts. Glyphosate refers to N-(phosphonomethyl)glycine. The glyphosate salts can be selected from:

sodium (Na) salts;

potassium (K) salts;

ammonium salts having $N(R)_4^+$ cations wherein R groups, identical or different, represent a hydrogen atom or a linear or non linear, saturated or unsaturated $C_1-C_6$ hydrocarbon group optionally substituted by a hydroxyl group, for example isopropylamine salts;

sulphonium salts.

Ammonium salts that can in particular be cited include salts obtained from tertiary, secondary or primary amines such as triethylamine (TEA), isopropylamine (IPA), dimethylamine (DMA), monomethylamine (MMA), diamines such as ethylenediamine, or alkanolamines such as monoethanolamine (MEA). Trimethylsulphonium is notably a suitable sulphonium salt.

It has been found that bioefficacy of a glyphosate composition can be significantly improved by using specific combinations of low molecular weight non-amphiphilic cations. The present invention notably utilizes a glyphosate salt component comprising at least two cations, such as two, three or more cations.

Preferred glyphosate salts for the invention are a mixture of at least two salts selected from glyphosate potassium (K) salt, glyphosate sodium (Na) salt, isopropylamine (IPA) salt, monoethanolamine (MEA) salt, monomethylamine (MMA) salt, triethylamine (TEA), dimethylamine (DMA), trimethylsulphonium salt, and ammonium ($NH_3$) salt.

Advantageously, the glyphosate salts for the invention are a mixture of a glyphosate potassium (K) salt, and one or more selected from glyphosate sodium (Na) salt, isopropylamine (IPA) salt, monoethanolamine (MEA) salt, monomethylamine salt (MMA), trimethylsulphonium salt, and ammonium ($NH_4^+$) salt.

In some embodiments, the glyphosate salts comprise potassium and isopropylammonium cations and optionally other cations, and the mole ratio of isopropylammonium to potassium cations is less than 30:1 and greater than 1:30, more preferably less than 15:1 and greater than 1:15.

In some embodiments, the glyphosate salts comprise isopropylammonium and monoethanolammonium cations, and the mole ratio of monoethanolammonium to isopropylammonium cations is less than 30:1 and greater than 1:30, more preferably less than 15:1 and greater than 1:15.

In some embodiments, the glyphosate salts comprise potassium, monomethylamine and ammonium cations. In such cases, the mole ratio of monomethylamine cations to the sum of potassium, monomethylamine, and ammonium cations in the range 30:100 to 80:100.

The at least two glyphosate salts are present in a total amount of equal or greater than 540 g/L (ae), for instance equal or greater than 560 g/L (ae), for instance equal or greater than 600 g/L (ae).

Surfactants

The composition of the invention comprises, in addition to the high load herbicidal active ingredients as described above, a surfactant system comprising at least an amide oxide and a tertiary amine surfactants.

In one embodiment, the composition comprises a surfactant mixture of at least:

an amine oxide surfactant of the formula:

$$R_1\text{—}N^+R_2R_3\text{—}O^- \quad (I)$$

wherein $R_1$ is a $C_6$-$C_{22}$, linear or branched, alkyl or hydroxyalkyl; $R_2$ and $R_3$ is independently a $C_1$-$C_4$ alkyl or hydroxyalkyl; and a tertiary amine surfactant of the formula:

$$R_4R_5R_6N \quad (II)$$

wherein $R_4$ and $R_5$ is independently a $C_1$-$C_4$ alkyl, alkenyl, hydroxyalkyl or hydroxyalkenyl, or form a ring structure; $R_6$ is a $C_6$-$C_{22}$ alkyl, alkenyl, hydroxyalkyl or hydroxyalkenyl; or the salts thereof.

In one embodiment, $R_1$ is a $C_8$-$C_{16}$, linear or branched, alkyl or hydroxyalkyl, preferably $R_1$ is a $C_8$-$C_{16}$ linear alkyl.

In one embodiment, $R_4$ and $R_5$ is independently a $C_1$-$C_4$ alkyl, $R_6$ is a $C_8$-$C_{16}$, alkyl, alkenyl, hydroxyalkyl or hydroxyalkenyl, preferably $R_6$ is a $C_8$-$C_{16}$ linear alkyl.

It is appreciated that said amine oxide surfactant is a $C_6$-$C_{22}$ amine oxide, which in context of the present invention refers to an amine oxide which contains $C_6$-$C_{22}$ alkyl chain only at the $R_1$ position or an amine oxide which contains substantially $C_6$-$C_{22}$ alkyl chain at the $R_1$ position. "Containing substantially $C_6$-$C_{22}$ alkyl chain" means it contains at least 90% $C_6$-$C_{22}$ alkyl chain based on the total alkyl chain for the $R_1$ position.

In one embodiment, the composition comprises a surfactant mixture of at least:

$$R_7\text{—}N^+(CH_3)_2\text{—}O^- \quad (III)$$

wherein $R_7$ is a $C_6$-$C_{22}$, linear or branched, alkyl or hydroxyalkyl; and a tertiary amine surfactant of the formula:

$$R_4R_5R_6N \quad (II)$$

wherein $R_4$ and $R_5$ is independently a $C_1$-$C_4$ alkyl, alkenyl, hydroxyalkyl or hydroxyalkenyl, or form a ring structure; $R_6$ is a $C_6$-$C_{22}$ alkyl, alkenyl, hydroxyalkyl or hydroxyalkenyl; or the salts thereof.

In one preferable embodiment, $R_7$ is a $C_8$-$C_{16}$, linear or branched, alkyl or hydroxyalkyl, more preferably $R_7$ is a $C_8$-$C_{16}$ linear alkyl. In another preferable In one embodiment, $R_4$ and $R_5$ is independently a $C_1$-$C_4$ alkyl, $R_6$ is a $C_8$-$C_{16}$, alkyl, alkenyl, hydroxyalkyl or hydroxyalkenyl, more preferably $R_6$ is a $C_8$-$C_{16}$ linear alkyl.

Said amine oxide according to general formula (I), for example, is decyl dimethyl amine oxide, dodecyl dimethylamine oxide, tetradecyl dimethylamine oxide or the combination thereof.

Said tertiary amine according the general formula (II), for example, includes and not limited to: decyl dialkyl amine, dodecyl dialkyl amine, tridecyl dialkyl amine, tetradecyl dialkyl amine or the combination thereof. Exemplary tertiary amine include but not limited to decyl dimethyl amine, dodecyl dimethyl amine, tridecyl dimethyl amine, tetradecyl dimethyl amine or the combination thereof.

The tertiary amine can be provided as a salt, which can be prepared by reacting with acids. The acids can be inorganic or organic and monovalent or polyvalent. Examples of organic acids are carboxylic acids, such as acetic acid, oxalic acid, malonic acid, tartaric acids, maleic acid, succinic acid, and citric acid. Other organic acids are alkyl esters of phosphoric acid. Examples of inorganic acids are hydrochloric acid, sulphuric acids, ortophosphoric acid, and phosphorous acid.

In some embodiments, the amine oxide surfactant is present in an amount ranging from about 0.1 wt % to about 20 wt %, based on the total weight of the aqueous herbicidal composition, for instance from about 0.1 wt % to about 15 wt %, for instance from about 0.1 wt % to about 10 wt %.

In some embodiments, the tertiary amine surfactant is present in an amount ranging from about 0.1 wt % to about 20 wt %, based on the total weight of the aqueous herbicidal composition, for instance from about 0.1 wt % to about 15 wt %, for instance from about 0.1 wt % to about 10 wt %.

In some embodiments, weight ratio of the amine oxide surfactant and the tertiary amine surfactant is in the range of from 5/95 to 95/5, for instance from 5/95 to 70/30, for instance from 5/95 to 60/40. In some preferable embodiments, weight ratio of the amine oxide surfactant and the tertiary amine surfactant is in the range of from of from 10/90 to 40/60, in such ratios, the aqueous herbicidal composition has more favorable stability. The weight ratio is based on 100% pure substance of the amine oxide surfactant or the tertiary amine surfactant.

The herbicidal compositions as described herein, incorporating high load of active ingredients, are characterized by at least one of the following properties: low temperature stability, bioefficacy, and low viscosity. The surfactant mixtures as described herein can protect certain concentrated water soluble liquid herbicide formulations from instability at low storage temperatures and better bioefficacy when compared to the same formulations containing a sole surfactant, such as amine oxide alone or tertiary amine.

Accordingly, the present invention provides a method for enhancing the storage stability of an aqueous herbicidal composition comprising at least two aminophosphate or aminophosphinate salts in a total amount of equal or greater than 540 g/L (ae), wherein the method comprises the step of adding to the composition a surfactant mixture of at least:

an amine oxide surfactant of the formula:

$$R_1\text{—}N^+R_2R_3\text{—}O^- \quad (I)$$

wherein $R_1$ is a $C_6$-$C_{22}$, linear or branched, alkyl or hydroxyalkyl; $R_2$ and $R_3$ is independently a $C_1$-$C_4$ alkyl or hydroxyalkyl; and a tertiary amine surfactant of the formula:

$$R_4R_5R_6N \quad (II)$$

wherein $R_4$ and $R_5$ is independently a $C_1$-$C_4$ alkyl, alkenyl, hydroxyalkyl or hydroxyalkenyl, or form a ring structure; $R_6$ is a $C_6$-$C_{22}$ alkyl, alkenyl, hydroxyalkyl or hydroxyalkenyl; or the salts thereof.

In particular, the present invention provides a method for enhancing the storage stability of an aqueous herbicidal composition comprising at least two glyphosate salts in a total amount of equal or greater than 540 g/L (ae), wherein the method comprises the step of adding to the composition a surfactant mixture of at least:

an amine oxide surfactant of the formula:

$$R_1\text{—}N^+R_2R_3\text{—}O^- \quad (I)$$

wherein $R_1$ is a $C_6$-$C_{22}$, linear or branched, alkyl or hydroxyalkyl; $R_2$ and $R_3$ is independently a $C_1$-$C_4$ alkyl or hydroxyalkyl; and a tertiary amine surfactant of the formula:

$$R_4R_5R_6N \qquad (II)$$

wherein $R_4$ and $R_5$ is independently a $C_1$-$C_4$ alkyl, alkenyl, hydroxyalkyl or hydroxyalkenyl, or form a ring structure; $R_6$ is a $C_6$-$C_{22}$ alkyl, alkenyl, hydroxyalkyl or hydroxyalkenyl; or the salts thereof.

The subject surfactant mixtures may be provided as in-package formulation adjuvants, which allow large-scale production of highly concentrated water soluble herbicide salt formulations, such as those containing the mixture of at least two salts of N-phosphonomethylglycine (commonly called glyphosate acid).

In some embodiments, the composition is stable at a temperature of equal or less than 20° C., typically equal or less than 10° C., or equal or less than 5° C. In this context, stability means minimal or no crystal formation nor phase separation at said low temperature. In another embodiment, stability means reduced formulation viscosity at said low temperature.

In some embodiments, the herbicidal compositions as described herein, optionally, contain a salt or a mixture of salts. The salt suitable for the present invention includes and is not limited to: quaternary ammonium salt such as choline chloride, ammonium sulfate, EDTA sodium salt, oxalate. In particular, the salt is a quaternary ammonium salt, preferably choline chloride.

In some embodiments, the herbicidal compositions as described herein, optionally, contain a solvent or blend of solvents. In one embodiment, the solvent is a polar solvent. In another embodiment, the solvent is water-miscible. The solvent includes, but is not limited to, one or a mixture of: a water-miscible glycol ether, a water-miscible polyhydric alcohol (e.g., glycerine or propylene glycol) ether, a water-miscible alcohol, a water-miscible ketone, a water-miscible aldehyde, a water-miscible acetate.

In some embodiments, the solvent is present in the herbicidal composition and comprises at least one of propylene glycol, glycerine or ethylene glycol.

Other solvents (or solvent blends include at least one of the following) include: N-methyl-pyrrolidone (NMP, can be further identified for example with CAS number 872-50-4), diester solvents, propylene carbonate, acetophenone, ethylene glycol butyl ether, diethylene glycol butyl ether, methoxy methyl butanol, propylene glycol methyl ether, dipropylene glycol methyl ether, gamma-butyrolactone, dimethyl formamide (DMF), furfuryl alcohol, tetrahydrofuryl alcohol, neopentyl glycol, hexadiols, hexylene glycol, glycol ether amines, ethylene glycol monoacetate.

In another aspect, described herein are methods for regulating plant growth comprising contacting any aqueous herbicidal composition, as described herein, with a plant.

In another aspect, described is the use of any of the herbicidal compositions herein for spray applying to a plant.

Further Additional Components

The herbicidal composition as described herein can, in other embodiments, comprise additional components such as: additional surfactants different from said $C_8$-$C_{10}$ amine oxide and tertiary amine surfactants, anti-foaming agents, solvents (e.g., water miscible solvent, polar solvents, and the like), deposition control agents such as anti-rebound or anti-drift agents. In one embodiment, such additional components are optionally added after the initial formulation step. This additional surfactant, in some embodiments, can provide further advantages or synergies in term of costs, and/or bioefficacy, and/or rheology management, and/or environment concerns.

Some non-limiting examples of the additional surfactants include at least one of: an ethoxylated fatty amine; a fatty amine; an ether carboxylate; an acid or non acid mono- and di-ester phosphate, optionally polyalkoxylated; an alkylmonoglycoside or alkylpolyglycoside, advantageously octylglycoside, an octylpolyclycoside, decylglycoside, a decylpolyglycoside.

In a particular embodiment the composition is substantially free (less than 10% by weight of the total composition, preferably less than 1%, preferably none) of a humectant selected from polyhydric alcohols, polysaccharide humectants, and mixtures thereof.

The compositions of the invention can be prepared by mixing their different constituents with moderate stirring, at a temperature in the range 15° C. to 60° C. In one embodiment, the temperature is ambient temperature (15-30° C.). The surfactant, in one embodiment, is added after the other components have been added and mixed. Alternatively the surfactant or a part thereof is added during neutralization of the aminophophate or aminophosphonate. The remaining components can be added afterwards.

The herbicidal composition of the invention can be thus used to treat plants, normally after diluting with water. The diluted composition can be applied onto a field by any appropriate mean. The dilution, and the application onto the field, can be for example such that the total amount of the at least two aminophosphate or amoniphosphonate salts, is of from 540 g acid equivalent/ha to 1500 g acid equivalent/ha, for instance from 560 to 1200 g/ha, for instance from 600 to 1200 g/ha.

Should the disclosure of any patents, patent applications, and publications which are incorporated herein by reference conflict with the description of the present application to the extent that it may render a term unclear, the present description shall take precedence.

EXAMPLES

Materials

Geronol® CF/K is $C_{12}$-$C_{14}$ dimethyl amine oxide from Solvay with 30% active content;

Fentamine DMA 12 is a $C_{12}$ dimethyl amine from Solvay

Glyphosate formulations containing MMA/K/$NH_4$ salts were prepared by using the steps below:

a) a glyphosate salt mixture containing MMA/K/$NH_4$ salts was prepared by firstly making a MMA/KOH/$NH_3$ bases at a molar ratio of 70/25/5 or 60/35/5.

b) Add the base mixture to the vessel.

c) Slowly charge reaction vessel the Glyphosate acid with continuous stirring, and cool the mixture if temperature succeeds 40° C.

d) check the pH (7% w/w) solution to confirm that neutralization is complete, if not add extra Base Mixture.

e) add Surfactant and mix in.

f) add remaining water subtracting any extra addition for the pH adjustment.

g) the final composition had a glyphosate concentration based on glyphosate acid equivalent indicated in the table expressed in grams of glyphosate acid equivalent per liter of composition (g ae/L Glyphosate).

Viscosity profiles were tested for stability, including low temperature stability. The viscosities (cP) was measured by using an RVT Spindle 2, at a speed of 20 rpm, at various temperatures.

Results are shown in Tables 1 and 2 below. In these tables, "S" refers to samples and "CS" refers to Comparative Samples.

TABLE 1

Viscosity Temperature Profile

|  | 600 g ae/L Formulations | Viscosity (cP) | | | |
|---|---|---|---|---|---|
|  |  | 5° C. | 10° C. | 15° C. | 20° C. |
| S1 | MMA/K/NH$_4$ (70/25/5, 600 g/L)<br>Geronol ® CF/K (12.5 g/L)<br>Fentamine ® DMA 12 (37.5 g/L) | 590 | 460 | 390 | 340 |
| S2 | MMA/K/NH$_4$ (70/25/5, 600 g/L)<br>Geronol ® CF/K (25 g/L)<br>Fentamine ® DMA 12 (25 g/L) | 540 | 430 | 340 | 260 |
| S3 | MMA/K/NH$_4$ (70/25/5, 600 g/L)<br>Geronol ® CF/K (37.5 g/L)<br>Fentamine ® DMA 12 (12.5 g/L) | 680 | 540 | 440 | 380 |
| CS1 | MMA/K/NH$_4$ (70/25/5, 600 g/L)<br>Fentamine ® DMA 12 (50 g/L) | 800 | 660 | 510 | 420 |
| CS2 | MMA/K/NH$_4$ (70/25/5, 600 g/L)<br>Geronol ® CF/K (50 g/L) | gelled | gelled | gelled | gelled |

TABLE 2

Viscosity Temperature Profile

|  | 600 g ae/L Formulations | Viscosity (cP) | | | |
|---|---|---|---|---|---|
|  |  | 5° C. | 10° C. | 15° C. | 20° C. |
| S4 | MMA/K/NH$_4$ (60/35/5, 600 g/L)<br>Geronol ® CF/K (12.5 g/L)<br>Fentamine ® DMA 12 (37.5 g/L) | 600 | 520 | 440 | 360 |
| S5 | MMA/K/NH$_4$ (60/35/5, 600 g/L)<br>Geronol ® CF/K (25 g/L)<br>Fentamine ® DMA 12 (25 g/L) | 590 | 470 | 380 | 300 |
| S6 | MMA/K/NH$_4$ (60/35/5, 600 g/L)<br>Geronol ® CF/K (37.5 g/L)<br>Fentamine ® DMA 12 (12.5 g/L) | 690 | 600 | 490 | 430 |
| CS3 | MMA/K/NH$_4$ (60/35/5, 600 g/L)<br>Fentamine ® DMA 12 (50 g/L) | 800 | 660 | 590 | 500 |
| CS4 | MMA/K/NH$_4$ (60/35/5, 600 g/L)<br>Geronol ® CF/K (50 g/L) | gelled | gelled | gelled | gelled |

It was shown that the surfactant mixtures according to the invention could make the high load glyphosate formulations stable, even at low temperatures. In contrast, the tertiary amine surfactant alone or the amine oxide surfactant alone led to high viscosities which is unfavorable.

Bioefficacy Evaluation

A greenhouse bioassay used annual ryegrass and variegated thistle to assess the effect of 2 high-load glyphosate (≈600 g/L) formulations. Each formulation was applied at either 90, 180 or 360 g ai/ha. A % control and fresh weight assessment were completed at 10 and 14 days after application (DAA) respectively.

Annual ryegrass and variegated thistle were sown in 10 cm diameter pots (0.70 L) filled with potting mix. Seedlings were grown in a greenhouse where temperature ranged between 10-35° C.

Herbicide treatments were applied using a DeVries Generation III Research track-sprayer. Spray solutions were prepared by adding water to tared 600 ml PET bottles to the designated mass (±1 g) (AND electronic balance, GF-6000±0.1 g) followed by the formulations. The PET bottles were capped, shaken and allowed to stand for 5 minutes before spray application.

A visual assessment of % control was completed at 10 DAA and a fresh weight (g) assessment was completed at 14 DAA. A visual rating scale was established by selecting plants with varying levels of herbicide damage and scoring in 10% increments with a 0% control being no symptoms and 100% being plant mortality. Seedlings treated with each formulation (90, 180 and 360 g ai/ha) were photographed at 14 DAA just before the fresh weight. For the fresh weight assessment, seedlings were harvested by cutting foliage at the stem base immediately prior to weighing (AND GF-300±0.01 g electronic balance).

Data was analyzed using ANOVA. 5% least significant differences (LSD) were calculated for the mean of each treatment. For visual assessments, the greatest herbicidal effect is denoted with alpha code "a" when significantly different to other treatments, which are coded "b", "c", "d" etc. with decreasing herbicidal effect. Alpha codes were reversed for fresh weight analysis.

TABLE 4 bioefficacy evaluation results for Annual Ryegrass

| Treatment with formulation | visual assessment of % control at 10 DAA | | | fresh weight assessment at 14 DAA | | |
|---|---|---|---|---|---|---|
| | 90 g ai/ha | 180 g ai/ha | 360 g ai/ha | 90 g ai/ha | 180 g ai/ha | 360 g ai/ha |
| S4 | 29 g | 49 de | 81 a | 3.64 b | 1.20 de | 0.22 e |
| S5 | 36 fg | 59 cd | 77 ab | 2.57 c | 1.04 de | 0.18 e |
| S6 | 34 fg | 59 cd | 81 a | 2.97 bc | 0.92 de | 0.15 e |
| Donaghys Grunt 600 | 43 ef | 67 bc | 80 a | 2.03 cd | 0.66 e | 0.15 e |
| LSD | | 8.8 | | | 0.836 | |

TABLE 5 bioefficacy evaluation results for Variegated thistle

| Treatment with formulation | visual assessment of % control at 10 DAA | | | fresh weight assessment at 14 DAA | | |
|---|---|---|---|---|---|---|
| | 90 g ai/ha | 180 g ai/ha | 360 g ai/ha | 90 g ai/ha | 180 g ai/ha | 360 g ai/ha |
| S4 | 40 f | 66 de | 87 b | 12.17 b | 3.93 ef | 0.82 gh |
| S5 | 39 f | 67 de | 94 ab | 12.52 b | 3.47 efg | 0.39 h |
| S6 | 43 f | 74 cd | 90 ab | 11.98 b | 2.64 fgh | 0.73 gh |
| Donaghys Grunt 600 | 49 f | 79 c | 99 a | 7.19 cd | 1.23 gh | 0.40 h |
| LSD | | 7.6 | | | 1.87 | |

As shown in tables 4 and 5, the aqueous herbicidal composition of the present invention showed favorable herbicidal bioefficacy.

The invention claimed is:

1. An aqueous herbicidal composition comprising:
at least two aminophosphate or aminophosphinate salts in a total amount of equal or greater than 540 g/L (ae), wherein the at least two aminophosphate or aminophosphinate salts are glyphosate salts;
an amine oxide surfactant of the formula:

wherein $R_7$ is a $C_6$-$C_{22}$, linear or branched, alkyl or hydroxyalkyl; and
a tertiary amine surfactant of the formula:

wherein $R_4$ and $R_5$ are independently a $C_1$-$C_4$ alkyl; $R_6$ is a $C_8$-$C_{16}$ linear alkyl; or the salts thereof.

2. The aqueous herbicidal composition of claim 1, wherein said at least two aminophosphate or aminophosphinate salts are present at equal or greater than 560 g/L (ae).

3. The aqueous herbicidal composition of claim 1, wherein said at least two aminophosphate or aminophosphinate salts are present at equal or greater than 600 g/L (ae).

4. The aqueous herbicidal composition of claim 1, wherein said at least two aminophosphate or aminophosphinate salts are selected from the group consisting of glyphosate potassium (K) salt, glyphosate sodium (Na) salt, glyphosate isopropylamine (IPA) salt, glyphosate monoethanolamine (MEA) salt, glyphosate monomethylamine (MMA) salt, glyphosatetriethylamine (TEA) salt, glyphosate dimethylamine (DMA) salt, glyphosate trimethylsulphonium salt, and glyphosate ammonium (NH4+) salt.

5. The aqueous herbicidal composition of claim 1, wherein said at least two aminophosphate or aminophosphinate salts are glyphosate potassium salt and glyphosate isopropylammonium salt.

6. The aqueous herbicidal composition of claim 1, wherein said at least two aminophosphate or aminophosphinate salts are glyphosate potassium salt and glyphosate ammonium salt.

7. The aqueous herbicidal composition of claim 1, wherein said at least two aminophosphate or aminophosphinate salts are glyphosate isopropylammonium salt and glyphosate monoethanolammonium salt.

8. The aqueous herbicidal composition of claim 1, wherein said at least two aminophosphate or aminophosphinate salts are glyphosate isopropylammonium salt and glyphosate ammonium salt.

9. The aqueous herbicidal composition of claim 1, wherein said at least two aminophosphate or aminophosphinate salts are glyphosate potassium salt, glyphosate monomethylamine salt and glyphosate ammonium salt.

10. The aqueous herbicidal composition of claim 1, wherein said at least two aminophosphate or aminophosphinate salts are glyphosate monomethylamine salt, glyphosate isopropylammonium salt and glyphosate ammonium salt.

11. The aqueous herbicidal composition of claim 1, wherein $R_7$ is a $C_8$-$C_{16}$ linear alkyl.

12. The aqueous herbicidal composition of claim 11, wherein said amine oxide surfactant is decyl dimethyl amine oxide, dodecyl dimethylamine oxide, tetradecyl dimethylamine oxide or the combination thereof.

13. The aqueous herbicidal composition of claim 1, wherein said tertiary amine surfactant is decyl dimethyl amine, dodecyl dimethyl amine, tridecyl dimethyl amine, tetradecyl dimethyl amine or the combination thereof.

14. The aqueous herbicidal composition of claim 1, wherein weight ratio of said amine oxide surfactant and said tertiary amine surfactant is in the range of from 10/90 to 40/60.

15. The aqueous herbicidal composition of claim 1, wherein said amine oxide surfactant is present in an amount of from 0.1 wt % to 10 wt %, based on the total weight of the aqueous herbicidal composition.

16. The aqueous herbicidal composition of claim 1, wherein said tertiary amine surfactant is present in an amount of from 0.1 wt % to 10 wt %, based on the total weight of the aqueous herbicidal composition.

17. The aqueous herbicidal composition of claim 1, wherein the composition further comprises choline chloride.

18. A method for regulating plant growth comprising contacting an aqueous herbicidal composition according to claim 1, with a plant.

19. A method of using the aqueous herbicidal composition according to claim 1, the method comprising spray applying the aqueous herbicidal composition to a plant.

20. A method for enhancing the storage stability of an aqueous herbicidal composition comprising at least two glyphosate salts in a total amount of equal or greater than 540 g/L (ae), wherein the method comprises the step of adding to the aqueous herbicidal composition comprising at least two glyphosate salts, a surfactant mixture of at least:

an amine oxide surfactant of the formula:

$$R_7-N^+(CH_3)_2-O^- \qquad (III)$$

wherein $R_7$ is a $C_6$-$C_{22}$, linear or branched, alkyl or hydroxyalkyl; and a tertiary amine surfactant of the formula:

$$R_4R_5R_6N \qquad (II)$$

wherein $R_4$ and $R_5$ are independently a $C_1$-$C_4$ alkyl; $R_6$ is a $C_8$-$C_{16}$ linear alkyl; or the salts thereof, to form the aqueous herbicidal composition of claim 1.

* * * * *